(12) United States Patent
Tarandek et al.

(10) Patent No.: US 11,891,029 B2
(45) Date of Patent: Feb. 6, 2024

(54) BRAKE SYSTEM FOR A VEHICLE

(71) Applicant: HL MANDO CORPORATION, Pyeongtaek-si (KR)

(72) Inventors: Kristijan Tarandek, Neu-Isenburg (DE); Hans-Jörg Feigel, Rosbach (DE)

(73) Assignee: HL MANDO CORPORATION, Pyeongtaek-si (KR)

( * ) Notice: Subject to any disclaimer, the term of this patent is extended or adjusted under 35 U.S.C. 154(b) by 276 days.

(21) Appl. No.: 17/217,093

(22) Filed: Mar. 30, 2021

(65) Prior Publication Data
US 2021/0309198 A1 Oct. 7, 2021

(30) Foreign Application Priority Data
Apr. 3, 2020 (DE) ............... 10 2020 204 401 U

(51) Int. Cl.
*B60T 11/16* (2006.01)
*B60T 13/62* (2006.01)
(Continued)

(52) U.S. Cl.
CPC .............. *B60T 13/62* (2013.01); *B60T 17/08* (2013.01); *F16B 7/042* (2013.01); *B60T 7/042* (2013.01);
(Continued)

(58) Field of Classification Search
CPC ...... B60T 8/4081; B60T 8/4086; B60T 8/409; B60T 11/18; B60T 2270/402;
(Continued)

(56) References Cited

U.S. PATENT DOCUMENTS

| | | | | |
|---|---|---|---|---|
| 5,813,230 A | * | 9/1998 | Hartl ....................... | B60T 11/16 60/591 |
| 2006/0163941 A1 | * | 7/2006 | Von Hayn ............... | B60T 7/042 303/155 |

(Continued)

*Primary Examiner* — Bradley T King
(74) *Attorney, Agent, or Firm* — Hauptman Ham, LLP

(57) ABSTRACT

The present invention relates to a brake system for a vehicle. The proposed brake system (1) comprises an actuation unit for actuating wheel brakes of the vehicle in a normal operating mode of the brake system (1). Further, the system (1) comprises a brake cylinder (2) for pressurizing the wheel brakes of the vehicle in an emergency operating mode of the brake system (1). The brake cylinder (2) comprises a brake cylinder housing (4) and a push rod (3) being displaceable within the brake cylinder housing (4) by operation of a brake pedal (5). The brake cylinder (2) further comprises a piston (14) movably arranged within the brake cylinder housing (4). The piston (14) has a first surface and a second surface opposite the first surface. A hydraulic chamber (11) is formed within the brake cylinder housing (4) between the first surface of the piston (14) and an inner surface of the brake cylinder housing (4). The hydraulic chamber (11) is configured for being selectively fluidly connected with the wheel brakes. The brake cylinder (2) further comprises an elastic simulator element (13) arranged between the second surface of the piston (14) and the push rod (3) for pedal feel simulation. The brake cylinder (2) further comprises a locking element (22) configured to selectively mechanically couple the push rod (3) with the piston (14) to provide a rigid connection between the push rod (3) and the piston (14) during the emergency operating mode.

6 Claims, 3 Drawing Sheets

(51) Int. Cl.
*B60T 17/08* (2006.01)
*F16B 7/04* (2006.01)
*B60T 8/40* (2006.01)
*B60T 7/04* (2006.01)

(52) U.S. Cl.
CPC ......... *B60T 8/4081* (2013.01); *B60T 2220/04* (2013.01); *B60T 2270/402* (2013.01); *B60T 2270/404* (2013.01); *B60T 2270/82* (2013.01)

(58) Field of Classification Search
CPC ........... B60T 2270/404; B60T 2270/82; B60T 13/62; B60T 7/042; B60T 17/08; B60T 2220/04; F16B 7/042
See application file for complete search history.

(56) References Cited

U.S. PATENT DOCUMENTS

| | | | |
|---|---|---|---|
| 2011/0248557 A1* | 10/2011 | Overzier | B60T 11/18 60/555 |
| 2011/0254357 A1* | 10/2011 | Vollert | B60T 13/586 303/2 |
| 2012/0091788 A1* | 4/2012 | Weiberle | B60T 7/042 60/568 |
| 2016/0264117 A1* | 9/2016 | Deng | B60T 13/745 |
| 2018/0037207 A1* | 2/2018 | Pennala | B60T 8/4086 |
| 2020/0282967 A1* | 9/2020 | Sellinger | B60T 11/16 |
| 2021/0309190 A1* | 10/2021 | Struschka | B60T 11/18 |
| 2021/0394730 A1* | 12/2021 | Cho | B60T 11/18 |

* cited by examiner

[Fig. 1]
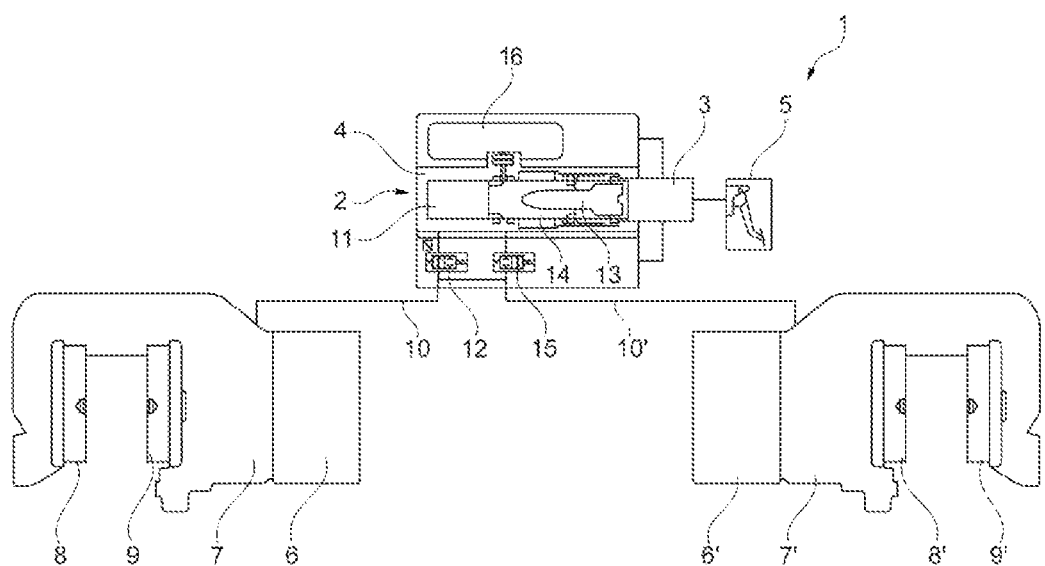

[Fig. 2]
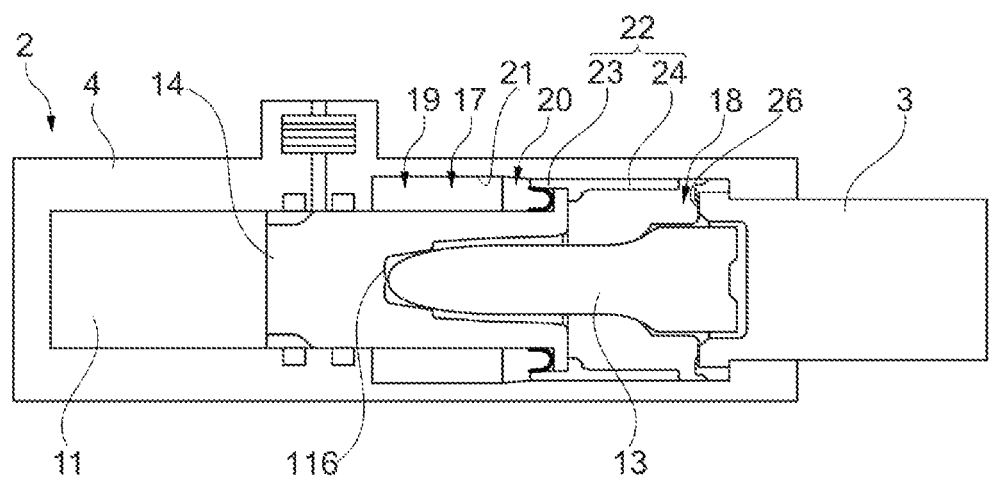

[Fig. 3a]
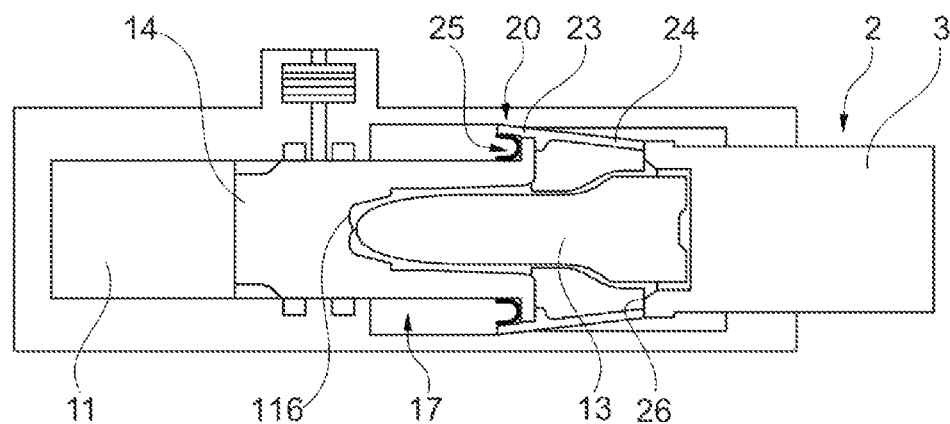
[Fig. 3b]
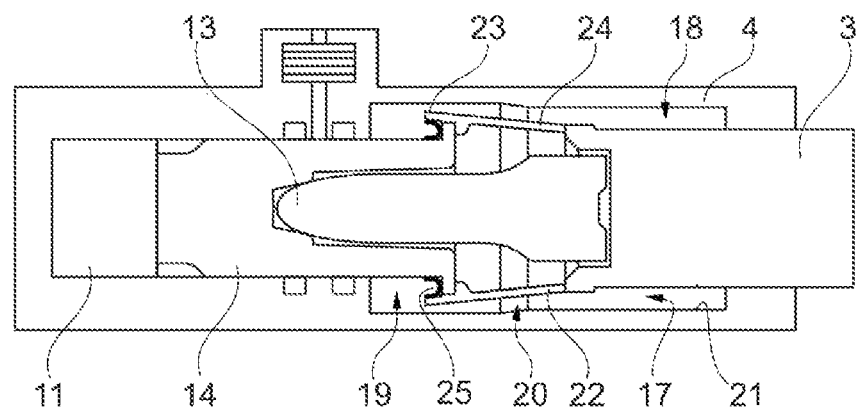

BRAKE SYSTEM FOR A VEHICLE

The present invention relates to a brake system for a vehicle. In particular, the present invention relates to a brake system comprising an actuation unit for actuating wheel brakes of the vehicle in a normal operating mode of the brake system and a brake cylinder for pressurizing the wheel brakes of the vehicle in an emergency operating mode of the brake system.

In a conventional powered brake system, a pedal travel sensor may be coupled to a brake pedal and operable to detect an amount of travel of the brake pedal, so that a corresponding signal can be sent to a controller. The controller interprets the signal and sends a further signal to a brake force supplier including an actuator. The actuator, in response to the signal, may, e.g., pressurize braking fluid to operate hydraulic wheel brakes of the vehicle. Furthermore, a separate pedal feel simulator may be provided to mimic the feel and travel of a conventional braking system that supplies fluid directly from a master cylinder to wheel cylinders. However, the design of such conventional power brake systems can be rather complicated and space consuming due to a relatively large number of parts. Other friction brake systems may comprise an electric motor for actuating the wheel brakes during normal operation based on the signals from the pedal travel sensor. These systems may have a gear unit for converting a rotary motion generated by the electric motor into a braking motion in which a brake pad is pushed against a brake disc.

In addition, brake systems may have a hydraulic fallback mode or emergency operating mode that is activated upon system malfunction. In the emergency operating mode, a direct hydraulic connection is made between a brake cylinder and the wheel brakes such that the wheel brakes may be actuated hydraulically by pushing the brake pedal. It is desired that the brake system ensures that the force and stroke applied to the brake pedal during emergency operation is converted into a braking force and braking motion without substantial losses.

In view of the above aspects, it is an object of the present application to provide an improved brake system for a vehicle. In particular, it is an object to provide a brake system which is comparably simple in its design and which ensures reliable and efficient operation in both the emergency operating mode and the normal operating mode.

This objective is achieved by a brake system having the features of independent claim 1. Optional further features and further developments will become apparent from the dependent claims and the detailed description in conjunction with the accompanying figures.

The proposed brake system for a vehicle comprises an actuation unit for actuating wheel brakes of the vehicle in a normal operating mode of the brake system. Further, the system comprises a brake cylinder for pressurizing the wheel brakes of the vehicle in an emergency operating mode of the brake system. The brake cylinder comprises a brake cylinder housing and a push rod being displaceable within the brake cylinder housing by operation of a brake pedal. The push rod may be arranged at least partially within the brake cylinder housing. The brake cylinder further comprises a piston movably arranged within the brake cylinder housing. The piston has a first surface and a second surface opposite the first surface. A hydraulic chamber is formed within the brake cylinder housing between the first surface of the piston and an inner surface of the brake cylinder housing. The hydraulic chamber is configured for being selectively fluidly connected with the wheel brakes. The brake cylinder further comprises an elastic simulator element arranged between the second surface of the piston and the push rod for pedal feel simulation. The brake cylinder further comprises a locking element configured to selectively mechanically couple the push rod with the piston to provide a rigid connection between the push rod and the piston during the emergency operating mode.

Due to the elastic simulator element, the proposed brake system, being of a comparable simple design with few parts, enables a brake pedal feel that is close to the feel and stroke of a conventional hydraulic brake system during the normal operating mode of the proposed brake system. As the elastic simulator element is formed as a part of the brake cylinder, no separate pedal simulator or additional switching or locking valves are required. Therefore, compared with conventional brake systems a compact brake system having a reduced number of parts can be provided. When the brake system is operated in the emergency operating mode, in which the hydraulic chamber may be pressurized upon pushing the brake pedal to actuate the brakes hydraulically, the locking element may span between the push rod and the piston to form a more rigid and stiff mechanical connection between the push rod and the piston. For this purpose, the locking element may be more rigid or stiff than the elastic simulator element. In this way, the locking element enables an improved operation during the emergency operating mode in that the stroke and force exerted by pushing the brake pedal is more reliably transmitted into a braking force and braking motion. Therefore, the proposed brake system is comparably simple in its design and ensures reliable and efficient operation in both the emergency operating mode and the normal operating mode.

The brake system may comprise a pedal sensor for detecting an operation of the brake pedal. E.g., the pedal sensor may be configured to sense a position or a stroke length of the brake pedal. The brake system may further comprise a control unit for controlling the actuation unit in the normal operating mode depending on sensor signals of the pedal sensor. For example, the actuation unit may comprise a hydraulic pressure supply. The actuation unit may be configured to pressurize the wheel brakes in the normal operating mode. In some embodiments, the wheel brakes may be actuated using an electric motor connected with the control unit in the normal operating mode.

Typically, the brake system comprises a cut-off valve. The cut-off valve may be arranged between the hydraulic chamber and the wheel brakes for cutting off a fluid connection between the hydraulic chamber and the wheel brakes in the normal mode of operation and for enabling a fluid connection between the hydraulic chamber and the wheel brakes in the emergency operating mode. Due to the cut-off valve being closed in the normal operating mode, the piston may be essentially motionless when the brake pedal is applied due to the fluid in the hydraulic chamber acting on the piston. In other words, a motion of the piston may be substantially reduced in the normal operating mode as compared with the emergency operating mode. When the brake pedal is pushed, the push rod pushes against the elastic simulator element. The elastic simulator element may then be compressed and/or may elastically deform. A driver thus experiences a counterforce when the brake pedal is operated. In the proposed brake system, the elastic pedal feel element can mimic the pedal force of a conventional braking system during a braking action. The elastic simulator element may be in contact, in particular in direct contact, with the second surface of the piston and/or with the push rod. In typical embodiments, the elastic simulator element is at least partially, in particular fully, arranged within the brake cylinder housing. The elastic simulator element may be a rubber element. In most embodiments, the elastic simulator element is a solid, one-piece body made from an elastically deformable material.

The emergency operating mode may be used as a back-up mode or hydraulic fall-back mode, for instance when there is a power failure or when the hydraulic pressure supply or one or more electrically actuated valves do not function properly. In the emergency operating mode braking fluid can be supplied directly from the brake cylinder to the hydraulic circuits. Thus, not only does the brake system provide a brake cylinder with an integrated pedal simulator in the normal operating mode, the brake system may also allow operating the hydraulic wheel brakes in case of an emergency. To improve the safety of the system, the cut-off valve may be normally open. In this way, the cut-off valve may be open when it is de-energized to allow for the emergency braking operation in case of power failure. Generally, after the brakes have been applied and when the hydraulic wheel brakes are released, the pressure in the hydraulic wheel brakes may be relieved by discharging brake fluid to a reservoir.

In most embodiments, the locking element is configured such that it mechanically couples the push rod with the piston upon motion of the piston. The locking element may be configured such that a motion of the piston triggers a locking motion of the locking element to provide the rigid connection between the push rod and the piston during the emergency operating mode. The locking motion may result in the coupling of the push rod with the piston. Therefore, the triggering of the locking motion of the locking element is linked to the transition of the system from the normal operating mode to the emergency operating mode while being comparably simple in its construction according to this embodiment. To provide a simple and efficient coupling, the locking element is typically mechanically connected with the piston. For example, the locking element may be movably attached to the piston. In this way, a conversion of the motion of the piston into the locking motion of the locking element may be easily achieved. In preferred embodiments, the locking element is pivotally connected with the piston. In this case, a motion of a first portion of the locking element in a first rotational direction, which may be triggered by the motion of the piston, can be converted into a rotational motion of a second portion of the locking element in an opposite rotational direction. For example, the motion of the piston may trigger a motion of the first portion of the locking element outward, i.e., away from a cylinder main axis, thereby leading to a motion of the second portion of the locking element inward, i.e., toward a cylinder main axis. The second portion of the locking element may then come into contact with the push rod to form the rigid connection between the push rod and the piston. Typically, the locking element is configured to be brought into contact with the push rod, in particular with the push rod only, to mechanically couple the push rod with the piston in a structurally simple embodiment. However, in other embodiments, the locking element may be configured to be brought into contact with the piston only or with both the piston and the push rod to mechanically couple the push rod with the piston.

The motion of the locking element is typically triggered by pushing the brake pedal in the emergency operating mode such that the pushing rod pushes against the elastic simulator element. The simulator element may in turn push against the piston such that hydraulic fluid exits the hydraulic chamber toward the wheel brakes, the cut-off valve typically being open in this situation.

In typical embodiments, the locking element is configured to selectively mechanically couple the push rod with the piston by mechanical means. The mechanical means may be purely mechanical means. The mechanical means may be configured for converting a force from application of the brake pedal into a motion of the locking element that mechanically couples the push rod with the piston. In this way, further actuation forces that trigger the locking motion of the locking member may not be necessary. However, in other embodiments electromechanical actuation of the locking element may also be possible.

In most embodiments, the brake cylinder housing comprises a simulator chamber. In the simulator chamber the locking element may be connected to the piston. The locking element may be configured to mechanically couple the push rod with the piston due to a movement of the locking element. This movement of the locking element may be triggered by a mechanical interaction between the locking element and an inner wall of the simulator chamber. For example, the shape of the inner wall of the simulator chamber may be such that the locking element performs the locking motion due to a relative movement of the locking element with respect to the inner wall of the simulator chamber. The locking element may be restraint-guided by the inner wall of the simulator chamber.

In a particularly simple, robust, and reliable embodiment, the brake cylinder housing comprises the simulator chamber in which the locking element is connected to the piston. The simulator chamber may comprise a larger diameter portion and a smaller diameter portion. The locking element may be connected with the piston. Further, the locking element may be in contact with the inner wall of the simulator chamber. The locking element may be configured such that a transition from the smaller diameter portion to the larger diameter portion upon movement of the piston brings the locking element into contact with the push rod to mechanically couple the push rod with the piston.

Typically, the brake system comprises a spring mechanism configured to force a portion of the locking element outward upon transition from the smaller diameter portion of the simulator chamber to the larger diameter portion. Thereby, a swiveling motion of the locking element may be caused that brings the locking element into contact with push rod.

In typical embodiment, the locking element is crown shaped. The locking element may comprise multiple teeth. The teeth may be circumferentially spaced from one another, in particular in equidistantly. The teeth may each be configured to selectively mechanically couple the push rod with the piston. Each tooth may be configured to be brought into contact with the push rod. The teeth may each be pivotally connected with the piston and may each be configured to perform a locking motion as described above or below.

Exemplary embodiments will be described in conjunction with the following figures.

FIG. 1 shows a schematic view of a brake system for a vehicle,

FIG. 2 shows a schematic view of the brake cylinder during a normal operating mode, and FIGS. 3(*a*) and (*b*) show schematic views of the brake cylinder during an emergency operating mode.

FIG. 1 shows a brake system 1 for a vehicle. The brake system 1 comprises a brake cylinder 2. The brake cylinder 2 comprises a push rod 3 and a brake cylinder housing 4 and is described in more detail below. The push rod 3 is connected with a brake pedal 5 such that pushing the brake pedal 5 pushes the push rod 3 into the brake cylinder housing 4. The brake pedal 5 is further coupled to a pedal travel sensor, which is coupled to a control unit (not shown) of the system 1. During a normal operating mode, braking may be performed using an actuation unit. The actuation unit may be connected with the control unit and comprises electro-magnetic brake units 6, 6'. The electro-magnetic brake units 6, 6' each comprise an electric motor and a rotation/translation gear to convert a rotational motion generated by the electric motor into a linear braking motion. The electro-magnetic brake units 6, 6' are each attached to or formed as a part with a wheel caliper assembly 7, 7'. The wheel caliper assemblies 7, 7' each comprise a set of brake pads 8, 8', 9, 9' configured to press against wheel brake discs (not shown) from opposing sides, when the braking motion is performed by the electro-magnetic brake units 6, 6'. During the normal operating mode, a stroke of the brake pedal 5 is detected using the pedal travel sensor and a corresponding signal is sent to the control unit. When the brake pedal 5 is applied by a driver of the vehicle, the control unit sends a brake signal to the electro-magnetic brake units 6, 6', which then perform the braking motion to stop or slow down the vehicle. In the example shown in the figure, two wheel caliper assemblies 7, 7' are shown. However, an electro-magnetic brake unit may be provided, e.g., on each of four wheels the vehicle.

The brake system 1 also comprises a hydraulic system as an emergency fallback mode when the actuation unit malfunctions. In the example shown in FIG. 1, the wheel caliper assemblies 7, 7' each comprise a hydraulic chamber designed to push the brake pads 8, 8', 9, 9' against the brake disks when pressurized. To pressurize the hydraulic chambers of the wheel caliper assemblies 7, 7', hydraulic connections 10, 10' are provided that fluidly connect the brake cylinder 2 with hydraulic chambers of the wheel caliper assemblies 7, 7'. The hydraulic connections 10, 10', e.g., hydraulic pipes, as well as the hydraulic chambers of the brake cylinder 2 and the wheel caliper assemblies 7, 7' may, e.g., be pre-filled with brake fluid prior to assembly of the system 1. By using pre-filled components, a fill and bleed process may not be required after assembly of the system 1.

The hydraulic connections 10, 10' are fluidly connected to a hydraulic chamber 11 of the brake cylinder 2 via a cut-off valve 12. The cut-off valve 12 may be selectively controllable by the control unit. Typically, the cut-off valve 12 is a solenoid valve, which is normally open (NO valve), such that it enables fluid to flow between the hydraulic chamber 11 of the brake cylinder 2 and the hydraulic chambers of the wheel caliper assemblies 7, 7' when the valve is de-energized. When the brake pedal 5 is applied in the emergency operating mode, the push rod 3 pushes against an elastic simulator element 13, which pushes a piston 14 into the hydraulic cavity 11 of the brake cylinder, thereby pushing hydraulic fluid from the hydraulic cavity 11 of the brake cylinder 2 through the cut-off valve 12 and into the hydraulic cavities of the wheel caliper assemblies 7, 7' to apply the brakes and slow the vehicle.

The system 1 further comprises a normally closed valve 15, which is configured to fluidly connect the hydraulic connections 10, 10' with a fluid reservoir or low pressure chamber 16. The chamber 16 may be included in the brake cylinder housing 4 so that no additional plastic reservoir is needed. In case the cut-off valve 12 leaks in the normal operating mode, the normally closed valve 15 ensures that brake fluid is supplied back to the chamber 16 instead of the brake fluid being applied to the brake caliper assemblies 7, 7'. Thereby, unintended brake activation may be prevented. The valves 12, 15 are depicted in their default, non-powered states, i.e., according to the emergency operating mode. In the fallback mode the normally closed valve 15 is closed and the normally open valve 12 is opened, so that a direct hydraulic connection is made between a brake cylinder and the wheel brakes.

FIG. 2 shows the brake cylinder 2 in more detail in a state corresponding to a normal operating mode. In the normal operating mode, the cut-off valve 12 is closed, so that depression of the brake pedal 5 does not directly apply braking force to the hydraulic wheel brakes. While, as described above, the brake cylinder 2 functions to operate the hydraulic wheel brakes in the emergency operating mode, in the normal operating mode, the brake cylinder 2 provides the function of pedal feel simulation. For this purpose, the elastic simulator element 13 is arranged between the push rod 3 and the piston 14 within the brake cylinder housing 4. The elastic simulator element 13 generates a pedal force when the brake pedal 5 is operated in the normal operating mode. The elastic simulator element 13 may be integrally formed of an elastomer, such as rubber or silicone. In particular, the elastic simulator element 13 is designed for a compression force and has a progressive spring characteristic. The elastic simulator element 13 has an elongate, solid body. A longitudinal direction of the elongate body is axially aligned with the brake cylinder 2. In the embodiment shown, a centerline of the elongate body coincides with a centerline of the brake cylinder 2. An axial end portion of the elastic simulator element 13 is in contact with and received within a recess 116 in the piston 14, and another axial end portion of the elastic simulator element 13 is in contact with and received within a recess in the push rod 3. The end portion of the elastic simulator element 13 facing the rod 14 is tapered. When the brake pedal 5 is completely depressed, the elastic simulator element 13 is deformed to snugly fit in the recess 116 of the second piston 14. In both the normal operating mode and the emergency mode, the elastic simulator element 13 is retained between the piston 14 and the push rod 3. In the normal operating mode (powered operating mode), the cut-off valve 12 is in its closed position. Therefore, the piston 14 is locked. When the driver depresses the brake pedal 5, the push rod 3 pushes toward the piston 14 and the elastic simulator element 13 is compressed. As a result, the driver experiences a brake pedal feel that he/she would also experience when operating a conventional brake system being solely hydraulically actuated during a brake action. In some embodiments, the push rod 3 may in addition be connected with a hydraulic damper, which may be incorporated in the cylinder housing 4. In this way, additional damping can be provided in a cost efficient way.

FIGS. 3(*a*) and (*b*) illustrate the brake cylinder 2 in the emergency operating mode (non-powered operating mode). In this case, the cut-off valve 12 is in its opened position to allow hydraulic communication between the hydraulic chamber 11 of the brake cylinder and the hydraulic chambers of the brake caliper assemblies 7, 7', so that the driver's input to the brake pedal 5 causes braking. Therefore, when the brake pedal 5 is applied, the push rod 3 pushes the piston 14 to the left first, see FIG. 3(*a*), and then further to the left, see FIG. 3(*b*).

The piston 14 and the push rod 3 are partially received within a simulator chamber 17 formed within the brake cylinder housing 4. The simulator chamber 17 comprises a smaller diameter portion 18 and a larger diameter portion 19 as well as a transition region 20 with increasing diameter between the smaller diameter portion 18 and the larger diameter portion 19. An inner wall 21 of the simulator chamber 17 is generally cylindrical in the smaller diameter portion 18 and in the larger diameter portion 19.

The brake cylinder 2 further comprises a rigid locking element 22 to reduce the travel loss that would be caused by a compression of the elastic simulator element 13, when the driver applies the brake pedal 5 in the emergency operating mode. The locking element 22 enables a rigid connection between the push rod 3 and the piston 14 in the emergency operating mode. For this purpose, the locking element 22 is attached to the piston 3 such that it can rotate with respect to the piston 3. The locking element 22 is arranged between the piston 3 and the inner wall 21 of the simulator chamber 17. The locking element 22 is crown shaped and comprises multiple teeth, an upper and lower one of which are shown in the figures. In addition, a spring 25 is arranged between the piston 3 and a portion 23 of the locking element 22. Another portion 24 extends toward the push rod 3.

In the normal mode of operation as shown in FIG. 2, the locking element 22 abuts the inner wall 21 of the simulator chamber 17 in the smaller diameter portion 18. In this case, no contact is made between the locking element 22 and the push rod 3. When the cut-off valve 12 opens in the emergency operating mode, the piston 14 is allowed to move to the left upon actuation of the brake pedal 5. In this situation, the locking element 22 is moved to the transition region 20 of the simulator chamber 17. Because the diameter of the simulator chamber 17 widens in the transition region 20, the spring 25 forces the portion 23 of the locking element 22 outward, as shown in FIG. 3(a). As the portion 23 is pushed outward, the other portion 24 of the locking element 22 moves inward due to the rotatable attachment of the locking element 22 with the piston 14. Eventually, the portion 24 of the locking element 22 that extends toward the push rod 3 comes into contact with a front surface 26 of the push rod 3. In this way, a force applied to the brake pedal 5 may be transmitted from the push rod 3 to the piston 14 via the rigid locking element 22 in the emergency operating mode. Hence, the locking motion of the locking element 22 is caused by a shape of the inner wall 21 of the simulator chamber 17 or may alternatively be caused by another integrated part having a corresponding shape. While the mechanism shown enables a fully mechanically triggered locking motion of the locking element 22, in other embodiments, the locking mechanism may electro-mechanically activated, in particular against a spring. For example, the locking motion of the locking element 22 may be controlled by the control unit to enable a programmable solution with higher flexibility.

As shown in FIG. 3(b), as the piston is pushed further into the hydraulic chamber 11, the locking element 22 maintains contact with the push rod 3 to enable reliable and efficient operation of the brake in the emergency operating mode. In some embodiments, the brake cylinder 2 is configured such that during a braking motion in the emergency operation, a ratchet-like locking mechanism provides several stops as the piston 14 is pushed into the hydraulic chamber 11 to make it possible to pump the brake in the emergency operating mode. In some embodiments, the system comprises a pressure sensor configured to measure a pressure in the hydraulic chamber 11 of the brake cylinder 2.

Features of the different embodiments which are merely disclosed in the exemplary embodiments may be combined with one another and may also be claimed individually.

The invention claimed is:

1. A brake system for a vehicle, comprising:
an actuation unit for actuating wheel brakes of the vehicle in a normal operating mode of the brake system; and
a brake cylinder for pressurizing the wheel brakes of the vehicle in an emergency operating mode of the brake system, the brake cylinder comprising:
a brake cylinder housing;
a push rod being displaceable within the brake cylinder housing by operation of a brake pedal;
a piston movably arranged within the brake cylinder housing, the piston having a first surface and a second surface opposite the first surface;
a hydraulic chamber formed within the brake cylinder housing between the first surface of the piston and an inner surface of the brake cylinder housing, wherein the hydraulic chamber is configured for being selectively fluidly connected with the wheel brakes;
an elastic simulator element arranged between the second surface of the piston and the push rod for pedal feel simulation; and
a locking element configured to selectively mechanically couple the push rod with the piston to provide a rigid connection between the push rod and the piston during the emergency operating mode,
wherein the locking element is pivotally connected with the piston at a joint, and includes a first portion on the left side of the joint extending towards the hydraulic chamber and a second portion on the right side of the joint extending towards the push rod,
wherein the brake cylinder further comprises a spring mechanism configured to force the first portion to move outward and the second portion to move inward, thereby causing a locking motion of the locking element that brings the locking element into contact with the push rod,
wherein the brake cylinder housing comprises a simulator chamber in which the locking element is connected to the piston, wherein the simulator chamber comprises a larger diameter portion and a smaller diameter portion, wherein the locking element is connected with the piston and is in contact with an inner wall of the simulator chamber, wherein the locking element is configured such that a transition from the smaller diameter portion to the larger diameter portion upon a motion of the piston brings the locking element into contact with the push rod to mechanically couple the push rod with the piston, and
wherein the spring mechanism is configured to force the first portion of the locking element to move outward upon transition from the smaller diameter portion of the simulator chamber to the larger diameter portion.

2. The brake system of claim 1, wherein the locking element is configured such that the motion of the piston triggers the locking motion of the locking element to provide the rigid connection between the push rod and the piston during the emergency operating mode.

3. The brake system of claim 1, wherein the locking element is configured to selectively mechanically couple the push rod with the piston by converting a force from application of the brake pedal into the locking motion of the locking element.

4. The brake system of claim 1, further comprising a cut-off valve arranged between the hydraulic chamber and the wheel brakes for cutting off a fluid connection between the hydraulic chamber and the wheel brakes in the normal operating mode and for enabling a fluid connection between the hydraulic chamber and the wheel brakes in the emergency operating mode.

5. The brake system of claim 4, wherein the cut-off valve is normally open.

6. The brake system of claim 1, further comprising a pedal sensor for detecting an operation of the brake pedal and a control unit for controlling brake actuation in the normal operating mode depending on sensor signals of the pedal sensor.

\* \* \* \* \*